United States Patent
Kim et al.

(10) Patent No.: US 6,892,381 B2
(45) Date of Patent: May 10, 2005

(54) UPDATING A DEVICE DRIVER WITH MECHANISM EMPLOYING TWO FILES ONE CONTAINING CHANGES (VARIABLE FILE) AND A FILE CONTAINING UNCHANGED CODE (INVARIABLE FILE) DOWNLOADING BOTH TO UPDATE

(75) Inventors: In-Soo Kim, Seoul (KR); Kyung-Young Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 09/988,707

(22) Filed: Nov. 20, 2001

(65) Prior Publication Data

US 2002/0073415 A1 Jun. 13, 2002

(30) Foreign Application Priority Data

Dec. 13, 2000 (KR) ........................................ 2000-76250

(51) Int. Cl.[7] .............................. G06F 9/44; G06F 9/445
(52) U.S. Cl. ......................... 717/171; 717/178; 703/22
(58) Field of Search .................................. 717/172, 178

(56) References Cited

U.S. PATENT DOCUMENTS

| | | | | |
|---|---|---|---|---|
| 5,580,177 A | | 12/1996 | Gase et al. ..................... 400/61 |
| 5,664,195 A | * | 9/1997 | Chatterji ....................... 717/178 |
| 5,794,052 A | * | 8/1998 | Harding ........................ 717/178 |
| 5,809,287 A | | 9/1998 | Stupek, Jr. et al. ............ 703/22 |
| 5,842,024 A | * | 11/1998 | Choye et al. ................. 717/178 |
| 5,905,492 A | * | 5/1999 | Straub et al. ................. 345/744 |
| 6,023,585 A | | 2/2000 | Perlman et al. .............. 717/178 |
| 6,088,717 A | * | 7/2000 | Reed et al. ................... 709/201 |
| 6,091,411 A | * | 7/2000 | Straub et al. ................. 345/747 |
| 6,470,496 B1 | * | 10/2002 | Kato et al. ................... 717/173 |
| 6,574,588 B1 | * | 6/2003 | Shapiro et al. ............... 703/24 |
| 6,604,235 B1 | * | 8/2003 | Harrison et al. ............. 717/168 |
| 6,668,376 B1 | * | 12/2003 | Wang et al. ................. 717/178 |

FOREIGN PATENT DOCUMENTS

| | | | |
|---|---|---|---|
| EP | 0716371 A2 | 6/1996 | |
| JP | 8-161250 | 6/1996 | |
| JP | 9-251355 | 9/1997 | |
| JP | 10-91500 | 4/1998 | |
| JP | 10-171634 | 6/1998 | |
| JP | 11-327828 | 11/1999 | |
| JP | 2000-10787 | 1/2000 | |
| JP | 2000-293366 | 10/2000 | ................. 717/178 |
| JP | 2000-330779 | 11/2000 | ................. 717/178 |
| KR | 1999-0061251 | 7/1999 | |

OTHER PUBLICATIONS

Beginning Visual C++ 5, Ivor Horton, Chapter 18, Mar. 19, 1997.*

* cited by examiner

*Primary Examiner*—Todd Ingberg
(74) *Attorney, Agent, or Firm*—Robert E. Bushnell, Esq.

(57) ABSTRACT

Disclosed are a system and a method for upgrading device drivers. The system for upgrading a device driver of a user's computer through a network, including an upgrade server dividing at least one device driver for upgrading into a variable file and an invariable file information according to a version thereof, and supplying the variable file and the invariable file information through the network; and an upgrading program installed in the user's computer, downloading the variable file and the invariable file information from the upgrade server and upgrading the device driver to the variable file based on the invariable file information. With this configuration, an end user can easily upgrade the device driver.

22 Claims, 6 Drawing Sheets

UPDATING A DEVICE DRIVER WITH MECHANISM EMPLOYING TWO FILES ONE CONTAINING CHANGES (VARIABLE FILE) AND A FILE CONTAINING UNCHANGED CODE (INVARIABLE FILE) DOWNLOADING BOTH TO UPDATE

CLAIM OF PRIORITY

This application makes reference to, incorporates the same herein, and claims all benefits accruing under 35 U.S.C. §119 from an application entitled System for Upgrading Device Driver and Method for Upgrading the Same earlier filed in the Korean Industrial Property Office on 13, Dec. 2000, and there duly assigned Serial No. 2000-76250 by that office.

BACKGROUND OF THE INVENTION

1. Field of the Invention

The present invention relates to a system and a method for upgrading a device driver, and more particularly, to a system and a method for upgrading a device driver through a network.

2. Description of the Background Art

Development of the Internet has brought many changes with respect to computer programs. In the past, to upgrade a program, a user had to directly install upgrade data to his or her computer, after downloading the upgrade data through a data room provided by a communication company in which a program maker publishes the upgrade data. Currently, however, a user can upgrade a program more easily through the Internet. Programs that allow the user to upgrade through the Internet, include for example a vaccine program V3 and the operating system MICROSOFT Windows. In the case of the V3 program, if a vaccine engine is upgraded, the user is allowed direct access to a server in the Internet through the V3 program, and then the new upgraded engine is downloaded to be automatically installed in the user's computer.

A device driver is distinguished from the above-described general programs. The device driver is a program controlling peripheral units of a computer system, such as a disk unit and a printer, etc. For example, the device driver includes a sound driver controlling a sound card, a graphics driver controlling a graphics card, a mouse driver controlling a mouse and so on. Since these device drivers are closely connected to an operating system of the computer system, being different from the general programs, it is not easy for end users to upgrade them using the Internet.

An earlier technique of upgrading a device driver includes, first, a user connecting his or her computer to an upgrade server, using an Internet-connecting program. After the computer is connected to the upgrade server, the user browses a device driver to be upgraded and downloads it to the computer. The upgrade device driver provided by the upgrade server is provided in a compressed file, in consideration of the speed of transfer and the size of the upgrade file, etc. Thus, the user decompresses the upgrade device driver to be downloaded using a compression program. If the upgrade device driver is decompressed, an install file of the upgrade device driver is generated. Then, the user executes the install file and upgrades the device driver. Finally, when the user reboots up his or her computer, the upgrading process of the device driver is completed.

As described above, because the upgrading of a device driver using the earlier technique is more complicated than that of the general programs, it is inconvenient for an end user to upgrade the device driver.

Exemplars of the art are Korean Patent No. 1999-0061251 issued to Lee, for Network System and Managing Method for a Version Manager Using an Internet and a Local Disk, Japanese Patent No. 8-161250 and European Patent Application EP 0716371A2 to Nakagiri, for Information Processing Apparatus Having Automatic Os Selecting Function, Japanese Patent No. 9-251355 issued to Yoshioka, for Printer, Japanese Patent No. 10-91500 issued to Tatsutaki, for Client/Server System, Differential File down Loading Method in Client/Server System and Storage Medium Storing Program for Differential File down Loading, Japanese Patent No. 10-171634 issued to Yagi, for Information Processing Terminal and Program Updating System, Japanese Patent No. 11-327828 issued to Omura, for Printing Controller, Driver Managing Method for the Same and Storage Medium Storing Program Which Computer Can Read, Japanese Patent No. 2000-10787 of issued to Kudo et al., for Program Down-loading Device and its Method, U.S. Pat. No. 5,580,177 issued to Gase et al., for Printer/Client Network with Centrally Updated Printer Drivers and Printer Status Monitoring, U.S. Pat. No. 5,809,287 issued to Stupek, Jr. et al., for Automatic Computer Upgrading, and U.S. Pat. No. 6,023,585 issued to Perlman et al., for Automatically Selecting and Downloading Device Drivers from a Server System to a Client System That Includes One or More Devices.

SUMMARY OF THE INVENTION

It is therefore an object of the present invention to provide a system and a technique for a device driver, allowing an end user to easily upgrade the device driver.

It is another object to update a device driver through a network in a reliable and efficient manner.

It is yet another object to easily upgrade the device driver by manipulating the device driver file on the upgrade server for installation on the user's computer.

It is still yet another object to speed up the upgrade of the device driver through a network by reducing the size of the file needed to upgrade the device driver.

It is another object to upgrade a device driver through networks with lower bandwidth by reducing the size of the file needed to upgrade the device driver.

It is still another object to increase the reliability of upgrading device drivers by having a backup.

The above and other objects of the present invention may be achieved by a provision of a system for upgrading a device driver of a user's computer through a network, including an upgrade server dividing at least one device driver to be upgraded into a variable file and an invariable file information according to an upgrade version, and supplying the variable file and the invariable file information through the network, and an upgrading program installed in the user's computer, downloading the variable file and the invariable file information from the upgrade server and upgrading the device driver to the variable file based on the invariable file information.

Preferably, the upgrading program includes a communication module for connecting the upgrade server and downloading the variable file and the invariable file information.

Preferably, the user's computer further includes a backup storage unit for storing the variable file and the invariable file information downloaded, for backup.

The device driver includes one of a sound driver, a mouse driver, a graphics driver, a LAN (Local Area Network) card driver and SCSI (Small Computer System Interface) driver.

According to another aspect of the present invention, a method for upgrading a device driver of a user's computer through a network, includes the steps of generating a variable file by extracting different parts between an old version and a new version thereof of the device driver, and an invariable file information by extracting the same parts between the old version and the new version thereof, storing at least one device driver having the variable file and the invariable file information in an upgrade server; downloading the variable file and the invariable file information from the upgrade server to the user's computer; and upgrading the device driver of the user's computer to the variable file based on the invariable file information.

Preferably, the method further includes the step of transmitting information about a version of the device driver installed in the user's computer to the upgrade server, where the upgrade server provides the device driver to allow the user to download the device driver, where the device driver of the user's computer is of an old version compared with the device driver of the upgrade server, based on the version information.

More preferably, the method further includes the steps of storing the variable file and the invariable file information in the user's computer for backup, during the step of downloading the variable file and the invariable file information; and recovering the device driver based on the backup variable file and the backup invariable file information, where an error occurs in the device driver of the user's computer.

Still preferably, the step of generating the variable file and the invariable file information includes the steps of installing the old version of the device driver to a first computer system and then storing a registry and a system file; installing the new version of the device driver to a second computer system and then storing a registry and a system file; and comparing the system having the old version of the device driver with the system having the new version of the device driver in terms of the registry and the system file to store the different parts between the old version and the new version of the device driver in the variable file, and to store the same parts between the old version and the new version of the device driver in the invariable file information.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
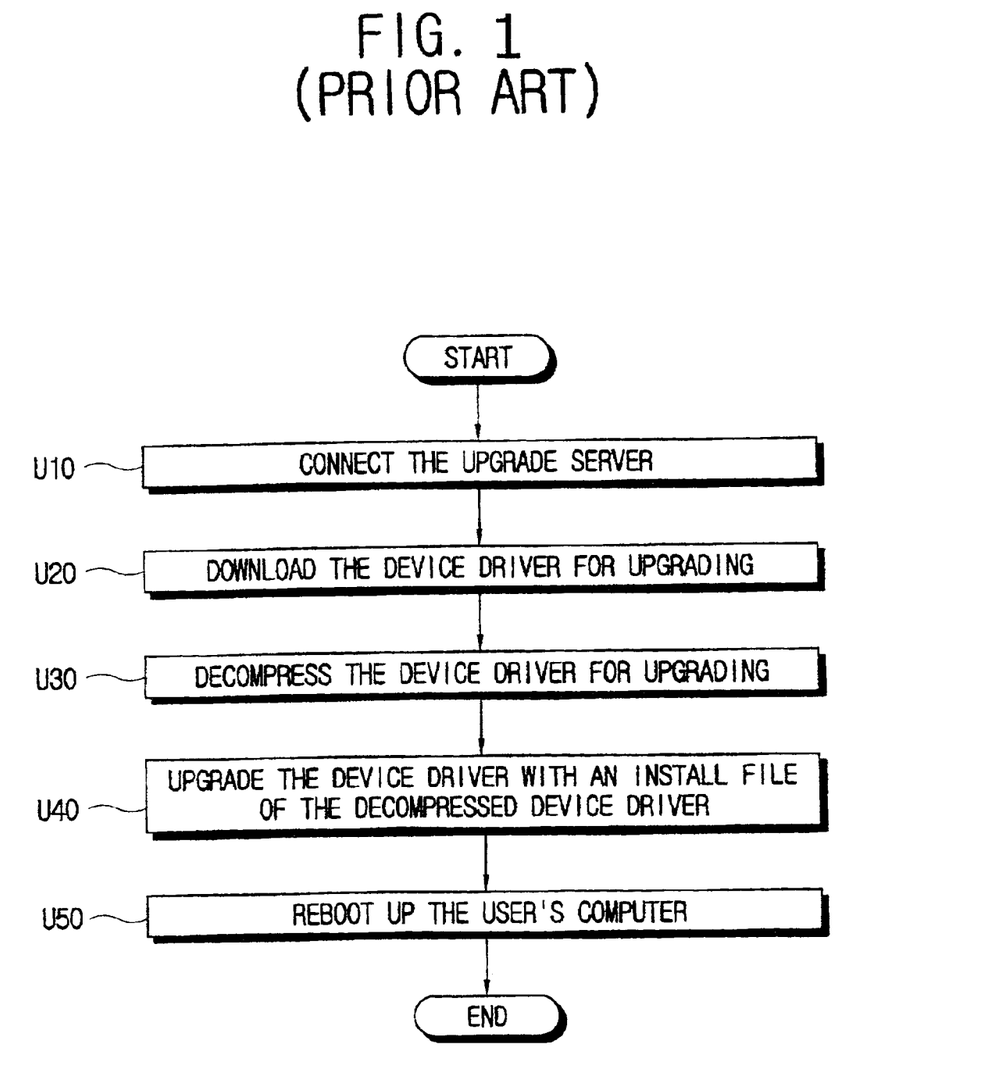
FIG. 1 is a flow chart showing a process that a user upgrades the device driver according to an earlier upgrading device driver system.

Turning now to the drawings, a process of upgrading a device driver according to an earlier method will be described with reference to FIG. 1.

First, a user connects his or her computer to an upgrade server, using an Internetconnecting program (U10). After the computer is connected to the upgrade server, the user browses a device driver to be upgraded and downloads it to the computer (U20). The upgrade device driver provided by the upgrade server is provided in a compressed file, in consideration of the speed of transfer and the size of the upgrade file, etc. Thus, the user decompresses the upgrade device driver to be downloaded using a compression program (U30). If the upgrade device driver is decompressed, an install file of the upgrade device driver is generated. Then, the user executes the install file and upgrades the device driver (U40). Lastly, if the user reboots up his or her computer (U50), the upgrading process of the device driver is completed.

Figure 2:
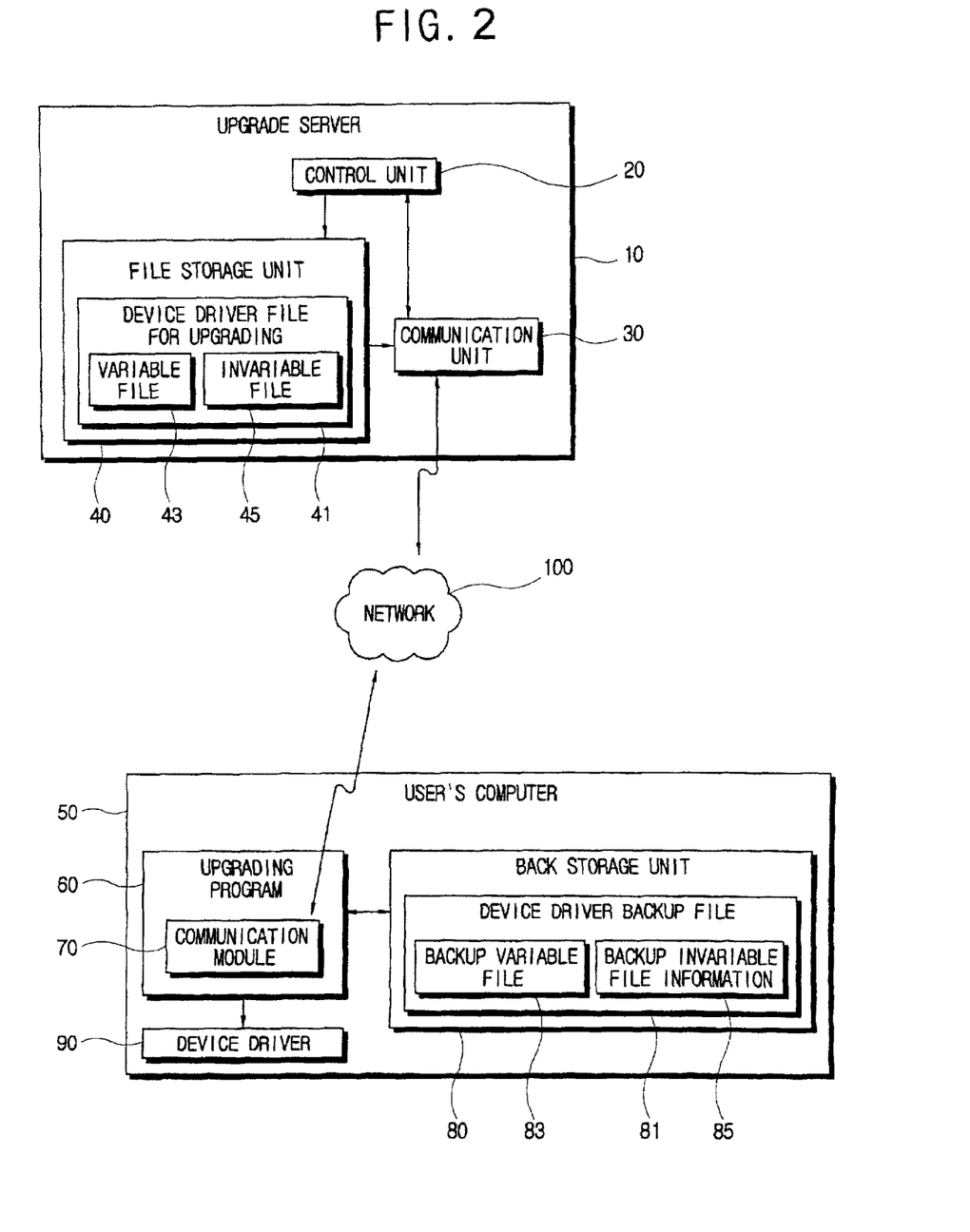
FIG. 2 is a block diagram of a system for upgrading a device driver according to the present invention.

Referring to FIG. 2, the system for upgrading a device driver according to the present invention includes an upgrade server 10 providing a device driver file 41 for upgrading, and a user's computer 50 equipped with an upgrade program 60 which can download and upgrade the device driver file 41 for upgrading from the upgrade server 10 through a network 100. A device driver 90 is a program controlling peripheral units of the computer system such as a disk unit, a printer, etc., including a sound driver controlling a sound card, as well as a mouse driver, a graphic driver, a LAN (Local Area Network) card driver, a SCSI (Small Computer System Interface) driver, etc.

The upgrade server 10 divides the device driver file 41 for upgrading into a variable file 43 and information on an invariable file 45 and provides them to the user's computer 50 through the network 100.

The upgrade server 10 includes a communication unit 30 (to be described later) communicating with the user's computer 50 through the network 100, a file storage unit 40 storing the device driver file 41 for upgrading which is provided to the user, and a control unit 20 controlling the file storage unit 40 to permit the user's computer 50 to download the device driver file 41 for upgrading in response to the user's download request.

The device driver file 41 to be stored in the file storage unit 40 is divided into the variable file 43 and the invariable file information 45. The variable file 43 is only the new file added to the device driver 90 when the device driver 90 is upgraded from the old version (before upgrading) to the new version (after upgrading). Also, the invariable file information 45 is information about the coexistent parts in both the new version's and the old version's registry and system file of operating systems when the device driver 90 is upgraded from the old version to the new version.

The control unit 20 in the upgrade server 10 provides the variable file 43 and the invariable file information 45 of the device driver file 41 stored in the file storage unit 40 to the user's computer 50 through the network 100 where a user logs on the upgrade server 10 though the user's computer 50 to request download of the device driver file 41.

Thus, the user does not need to download the whole device driver file, but downloads only the variable file 43 containing the parts upgraded from the old version to the new version and the invariable file information 45 retained in the system.

The control unit 20 receives information on the device driver 90 stored in the user's computer 50 and compares it with information on the device driver file 41 stored in the file storage unit 40. Where the device driver file 41 stored in the file storage unit 40 is of the new version, the control unit 20 provides the device driver file 41 to the user's computer 50.

Even if the user's computer 50 does not log on the upgrade server 10, the control unit 20 transmits information about the device driver file 41 of the new version to the user's computer 50 based on log-on data like e-mail information, where the upgrade server 10 is equipped with the device driver file 41 of the new version so that the user's computer 50 is allowed to download the device driver file 41 of the new version.

The user's computer 50 connected to the upgrade server 10 to download the upgrading device driver file 41, includes the device driver 90 to be upgraded, an upgrading program 60 and a backup storage unit 80.

The upgrading program 60 includes a communication module 70 to log on the user's computer 50 to the upgrade server 10 through the network 100. The upgrading program 60 downloads the device driver file 41 for upgrading from the upgrade server 10 being connected by the communication module 70. The upgrading program 60 transmits information about the device driver 90 of the user's computer 50 to the upgrade server 10 through the communication module 70 and where the upgrade server 10 has the device driver file 41 of the new version, the upgrading program 60 receives the list (not shown) of the device driver file 41 of the new version from the upgrade server 10. Also, the upgrading program 60 stores a backup of the variable file 43 and the invariable file information 45 of the device driver file 41 being downloaded from the upgrade server 10 in the backup storage unit 80.

Where the device driver 90 installed in the user's computer 50 generates an error, a backup variable file 83 and a backup invariable file information 85 of a device driver file 81 stored in the backup storage unit 80 are brought by the upgrading program 60. Then, the upgrading program 60 recovers the device driver 90 of the user's computer 50 from the backup variable file 83 based on the backup invariable file information 85.

Figure 3A:
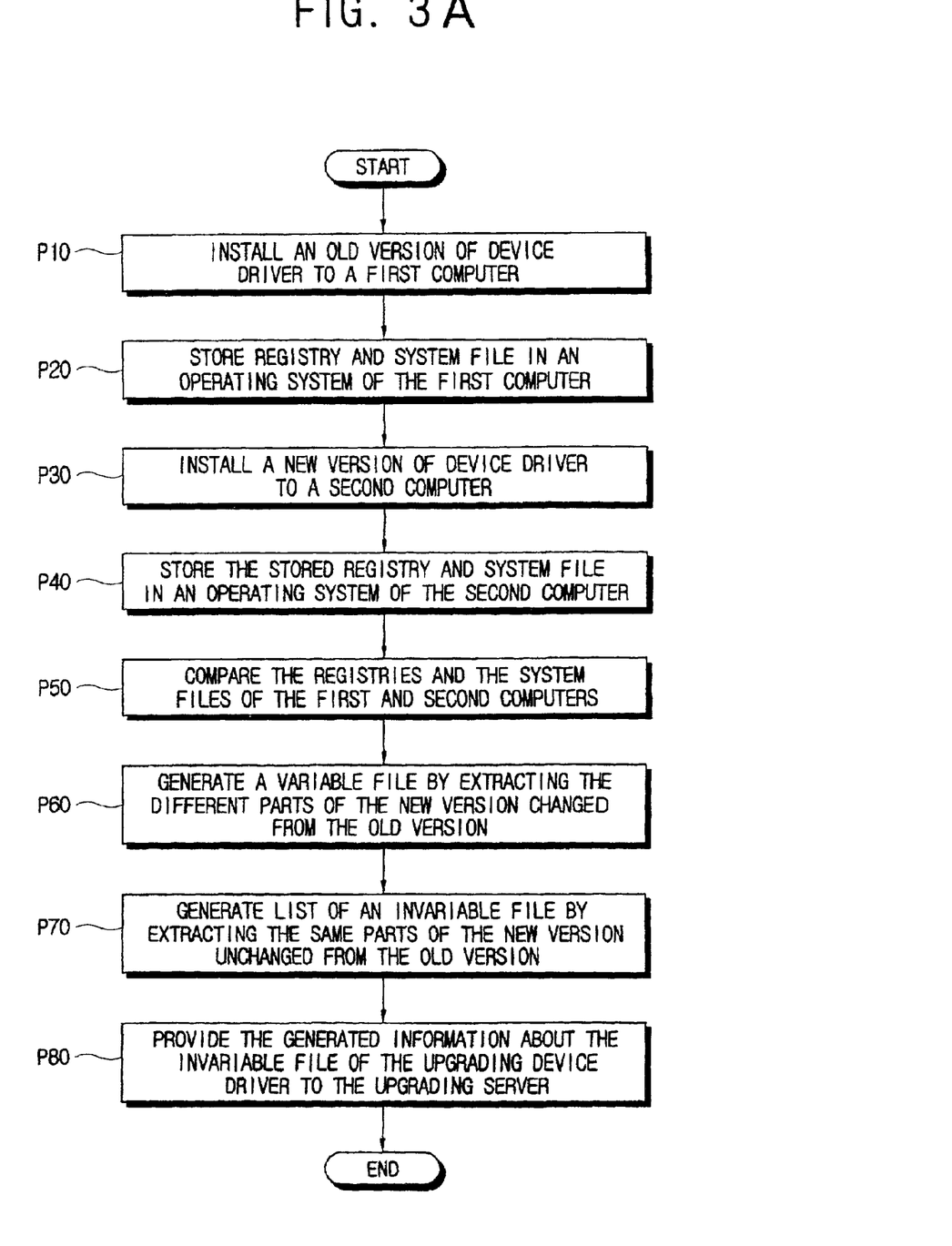
FIG. 3A is a flow chart showing a process that a server produces data related to a variable file and information of an invariable file from the upgrading device driver system according to the present invention.
Figure 3B:
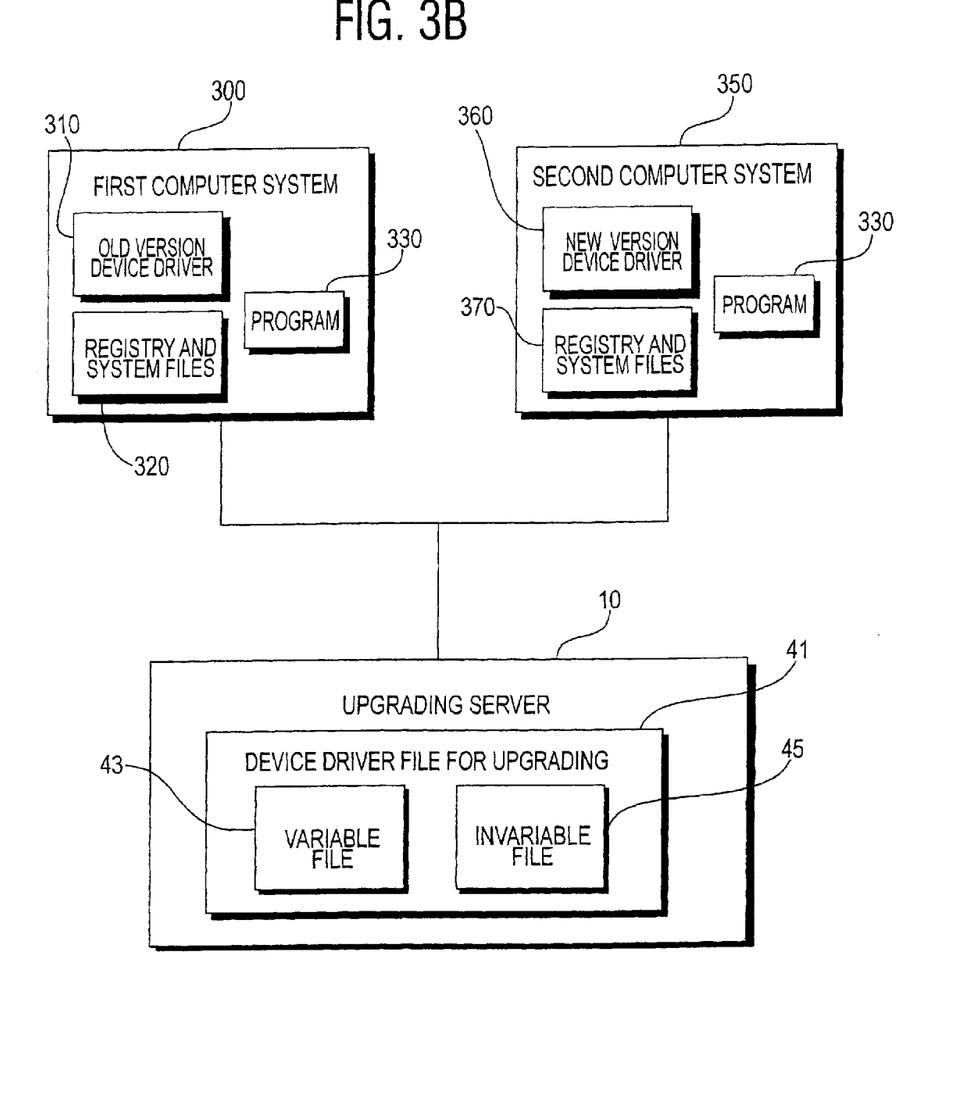
FIG. 3B is a block diagram of the system for producing the data related to the variable file and information of the invariable file.

A process of generating the variable file 43 and the invariable file information 45 of the device driver file 41 for upgrading will be described with reference to FIG. 3A and 3B.

The device driver 90 of the old version 310 is installed in a first computer system (P10). Then a registry and a system file 320 of the operating system are adaptively changed. The changed registry and system files 320 of the operating system are stored in the operating system of the first computer system 300 by a commercial utility 330 such as "PICTURE TAKER" (P20). The device driver 90 of the new version 360 is installed in a second computer system 350 having the same configuration as the first computer system 300 (P30). In response to the installation of the device driver 90 of the new version 360, the registry and the system file 370 of the operating system are changed in the second computer system 350. The changed registry and system file 370 are stored in the operating system of the second computer system 350 by the "PICTURE TAKER" program 330 (P40).

With respect to the device drivers 90 of the old version 310 and the new version 360, the registry and the system files 320 and 370 stored in the operating system of the computer systems 300 and 350 by the "PICTURE TAKER" program 330 are compared to extract the different parts between the old version 310 and the new version 360 of the device driver 90 (P50), and the different parts are generated to the variable file 43 (P60). The same parts between the old version 310 and the new version 360 of the device driver 90 are extracted to constitute the invariable file information 45 (P70). The variable file 43 and the invariable file information 45 of the device driver file 41 are provided to the upgrade server 10 (P80).

Figure 4A:
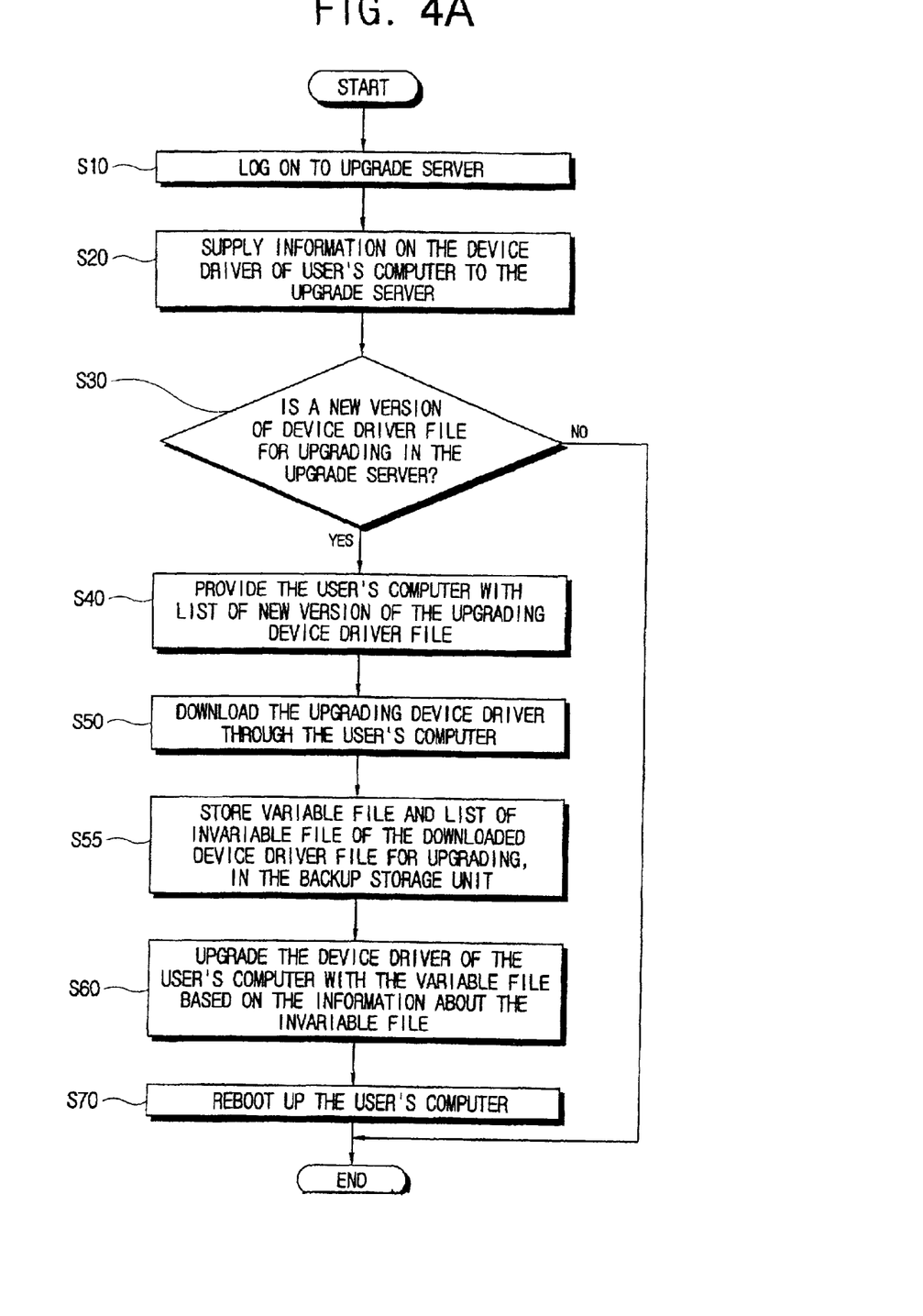
FIG. 4A is a flow chart showing a process that a user upgrades the device driver by an upgrading device driver system according to the present invention.
Figure 4B:
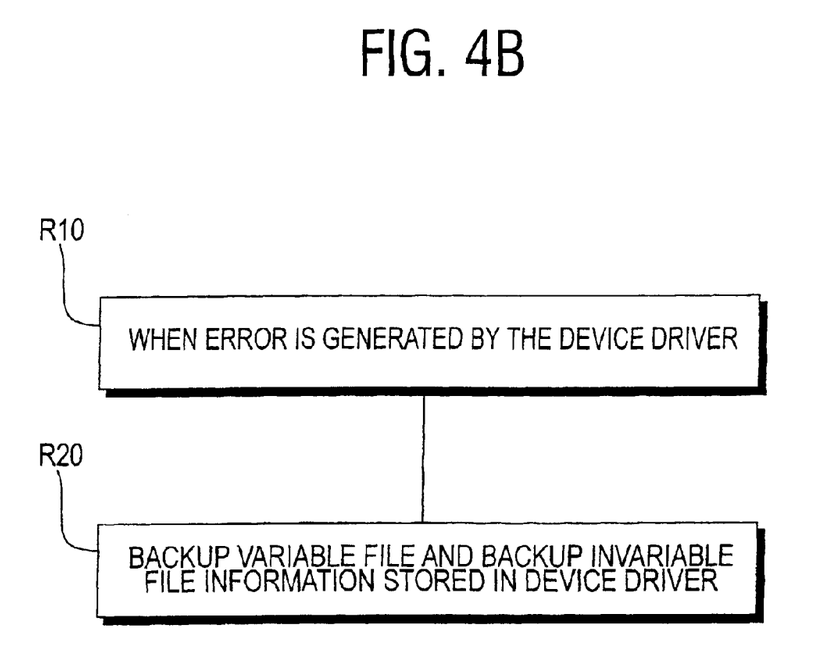
FIG. 4B is a flow chart showing a process when there is an error in the driver installation.

A process of upgrading a device driver by the user's computer in the upgrading device driver system according to the present invention will be described with reference to FIGS. 4A and 4B.

A user logs on his or her computer 50 to be connected to the upgrade server 10, using the upgrading program 60 provided therein (S10). The upgrading program 60 transmits information on the device driver 90 installed in the user's computer 50 to the upgrade sever 10 through the communication module 70 simultaneously as it connects the upgrade server 10 (S20).

The control unit 20 in the upgrade server 10 compares information on the device driver file of the file storage unit 40 with the transmitted information on the device driver 90 (S30). Where the upgrade server 10 is equipped with the device driver file 41 of the new version, the control unit 20 provides the list of the device driver file 41 of the new version to the user's computer 50 (S40). The user downloads a device driver file 41 (a variable file and information of an invariable file) which he or she wants to upgrade through the user's computer 50, among the list of the new version of the device driver files 41 (S50). If the download is completed, the upgrading program 60 upgrades the device driver 90 of the user's computer 50 according to the variable file 43, based on information of the invariable file 45 of the device driver file 41 downloaded (S60). If the upgrade of the device driver 90 is completed, the upgrading program 60 makes the user's computer 50 reboot (S70).

In the step S30, the user ends the upgrading where the upgrade server 10 is not equipped with the device driver file 41 of the new version. After the step S50, in consideration of a possible error generated by the device driver 90 during operation of the device driver 90, the upgrading program 60 stores the backup of the variable file 43 and the invariable file information 45 of the device driver 90 downloaded for upgrading in the backup storing part 80 (S55). As seen in FIG. 4B, in the case of an error generated by the device driver 90 installed in the user's computer, the backup variable file 83 and the backup invariable file information 85 of the backup device driver file 81 stored in the backup storage unit 80 are brought and stored in the device driver 90.

As described above, the user can upgrade easily the device driver, by dividing the device driver file into the variable file and the invariable file information, storing them in the upgrade server and installing the upgrading program in the user's computer.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A system for upgrading a device driver of a computer through a network, comprising:

an upgrade server dividing at least one device driver to be upgraded into a variable file and an invariable file information according to an upgrade version, and supplying said variable file and said invariable file information through said network; and a computer including an upgrading program installed, said computer downloading said variable file and said invariable file information from said upgrade server and upgrading said device driver with said variable file based on said invariable file information.

2. The system according to claim 1, with said upgrading program including a communication module connecting with said upgrade server and downloading said variable file and said invariable file information.

3. The system according to claim 2, with said computer further including a backup storage unit storing said variable file and said invariable file information downloaded, for backup.

4. The system according to claim 1, with said device driver selected from the group consisting of a sound driver, a mouse driver, a graphics driver, a local area network card driver, and small computer system interface driver.

5. The system according to claim 1, with said computer further comprising a backup copy of said variable file and a backup copy of said invariable file information of said device driver.

6. The system according to claim 5, with said backup copy of said variable file and invariable file information accommodating a correction of an error in said device driver in said computer.

7. The system according to claim 5, with said backup copy of said variable file and invariable file information being stored in a backup storage unit of said computer to recover said device driver with said variable file according to said invariable file information when the error occurs.

8. The system according to claim 1, with said upgrade server further comprising a control unit comparing information on said device driver on said computer with said variable file and said invariable file information on said upgrade server to determine whether said device driver will be updated with said variable file according to said invariable file information.

9. The system according to claim 1, further comprising a control unit controlling said variable file and invariable file information to permit said computer to download said variable file and invariable file information for upgrading in response to a download request from said computer.

10. The system according to claim 9, with said control unit receiving information on said device driver stored in said computer and comparing said device driver stored in said computer with information on said variable file and invariable file to permit said computer to download said variable file and invariable file information from said upgrade server.

11. The system according to claim 9, with said control unit transmitting information of said invariable file and variable file to said computer through electronic mail.

12. A method for upgrading a device driver of a computer through a network, comprising the steps of:

generating a variable file by extracting parts being different between an old version and a new version of said device driver, and an invariable file information by extracting parts being the same between said old version and said new version of said device driver;

storing at least one device driver having said variable file and said invariable file information in an upgrade server;

downloading said variable file and said invariable file information from said upgrade server to said computer; and upgrading said device driver of said computer to said variable file based on said invariable file information.

13. The method according to claim 12, further comprising the step of transmitting information of a version of said device driver installed in said computer to said upgrade server, said upgrade server providing said device driver of said computer to allow said computer to download said device driver of said upgrade server, said device driver of said computer being an old version compared with said device driver of said upgrade server, based on the version information.

14. The method according to claim 12, further comprising the steps of:

storing said variable file and said invariable file information in said computer for backup, during said step of downloading said variable file and said invariable file information; and recovering said device driver based on said backup variable file and said backup invariable file information, when an error occurs in said device driver of said computer.

15. The method according to claim 12, with said step of generating said variable file and said invariable file information, comprising the steps of:

installing said old version of said device driver to a first computer system and then storing a registry and a system file;

installing said new version of said device driver to a second computer system and then storing a registry and a system file; and comparing said first computer system having said old version of said device driver with said second computer system having said new version of said device driver in terms of the registry and the system file to store the different parts between the old version and the new version of the device driver in the variable file, and to store the same parts between the old version and the new version of the device driver in the invariable file information.

16. The method according to claim 12, further comprising the steps of:

supplying information of a version of said device driver installed in said computer to said upgrade server; and providing said computer with a list of said variable file and said invariable file information to said computer when said variable file and said invariable file information being of a newer version than said device driver on said computer.

17. The method according to claim 12, further comprising the step of transmitting information of said variable file and said invariable file to said computer according to log-on data to allow the downloading of said variable file and invariable file.

18. The method according to claim 17, with the log-on data being from electronic mail information.

19. A method, comprising the steps of:

generating a variable file by extracting parts being different between an old version and a new version of a device driver, and an invariable file information by extracting parts being the same between said old version and said new version of said device driver;

storing said variable file and said invariable file information;

downloading said variable file and said invariable file information to said computer from storage; and upgrading said device driver of said computer to said variable file based on said invariable file information.

20. The method according to claim 19, further comprising the step of comparing the version of said device driver installed in said computer with said variable file and said invariable file information to allow said computer to download said variable file and said invariable file.

21. The method according to claim 19, further comprising the steps of:

storing said variable file and said invariable file information in said computer for backup, during said step of downloading said variable file and said invariable file information; and recovering said device driver according to said backup variable file and said backup invariable file information, when an error occurs in said device driver of said computer.

22. The method according to claim 19, with said step of generating said variable file and the invariable file information, comprising the steps of:

installing said old version of said device driver to a first computer system and then storing information of an operating system of said first computer;

installing said new version of said device driver to a second computer system and then storing information of an operating system of said second computer; and comparing said stored information of the operating systems of said first computer system and said second computer system to generate said variable file and said invariable file information.

* * * * *